(12) United States Patent
Bockius et al.

(10) Patent No.: US 8,666,853 B2
(45) Date of Patent: Mar. 4, 2014

(54) METHOD AND SYSTEM FOR DISTRIBUTION OF USER GENERATED CONTENT

(71) Applicant: Bazaarvoice, Inc., Austin, TX (US)

(72) Inventors: Chad Bockius, Austin, TX (US); Brantley Barton, Austin, TX (US); Andrew Maag, Austin, TX (US); Sam Decker, Cedar Park, TX (US)

(73) Assignee: Bazaarvoice, Inc., Austin, TX (US)

( * ) Notice: Subject to any disclaimer, the term of this patent is extended or adjusted under 35 U.S.C. 154(b) by 0 days.

(21) Appl. No.: 13/650,869

(22) Filed: Oct. 12, 2012

(65) Prior Publication Data
US 2013/0041777 A1 Feb. 14, 2013

Related U.S. Application Data

(63) Continuation of application No. 12/243,679, filed on Oct. 1, 2008, now Pat. No. 8,321,300.

(60) Provisional application No. 61/076,852, filed on Jun. 30, 2008.

(51) Int. Cl.
*G07B 17/00* (2006.01)
*G07F 19/00* (2006.01)
*G06Q 30/00* (2012.01)

(52) U.S. Cl.
USPC ...... 705/30; 705/26.1; 705/26.35; 705/26.61; 705/26.7; 705/27.1

(58) Field of Classification Search
USPC ........... 705/26.1, 26.35, 26.61, 26.7, 27.1, 30
See application file for complete search history.

(56) References Cited

U.S. PATENT DOCUMENTS

| | | | |
|---|---|---|---|
| 5,528,490 A | 6/1996 | Hill | |
| 5,761,649 A | 6/1998 | Hill | |
| 5,999,908 A | 12/1999 | Abelow | |
| 6,029,142 A | 2/2000 | Hill | |
| 6,236,994 B1 | 5/2001 | Swartz et al. | |
| 6,757,682 B1 | 6/2004 | Naimark et al. | |
| 6,785,671 B1 | 8/2004 | Bailey et al. | |
| 6,999,962 B2 | 2/2006 | Julliard et al. | |
| 7,133,834 B1 | 11/2006 | Abelow | |
| 7,143,089 B2 | 11/2006 | Petras et al. | |
| 7,222,078 B2 | 5/2007 | Abelow | |
| 7,343,294 B1 | 3/2008 | Sandholm et al. | |
| 7,409,362 B2 * | 8/2008 | Calabria | 705/26.1 |
| 7,428,496 B1 | 9/2008 | Keller et al. | |

(Continued)

OTHER PUBLICATIONS www.bazaarvoice.com (http://web.archive.org/web/20070409104639/http://bazaarvoice.com/solution.html).*

(Continued)

*Primary Examiner* — Ig T An
(74) *Attorney, Agent, or Firm* — Meyertons, Hood, Kivlin, Kowert & Goetzel, P.C.

(57) ABSTRACT

Systems and methods for distributing user-generated content are disclosed. Specifically, embodiments of the present invention may allow content to be generated by a user at a manufacturer's site with respect to a corresponding product and this content distributed to one or more retailers who sell that product such that the user-generated content may be incorporated into the retailer's site or brick and mortar location in conjunction with that product to allow consumers shopping at that retailer to access or view such user-generated content.

20 Claims, 8 Drawing Sheets

(56) References Cited

U.S. PATENT DOCUMENTS

| | | | |
|---|---|---|---|
| 7,620,565 B2 | 11/2009 | Abelow | |
| 7,620,651 B2 | 11/2009 | Chea et al. | |
| 7,908,173 B1 | 3/2011 | Hill | |
| 7,908,176 B1 | 3/2011 | Hill | |
| 7,930,363 B2 | 4/2011 | Chea et al. | |
| 7,937,391 B2 | 5/2011 | Chea et al. | |
| 8,001,003 B1 | 8/2011 | Robinson et al. | |
| 8,195,522 B1* | 6/2012 | Sonne et al. | 705/26.2 |
| 8,214,261 B2 | 7/2012 | Chen et al. | |
| 8,321,300 B1 | 11/2012 | Bockius et al. | |
| 2002/0023144 A1 | 2/2002 | Linyard et al. | |
| 2002/0107861 A1* | 8/2002 | Clendinning et al. | 707/101 |
| 2002/0112035 A1 | 8/2002 | Carey et al. | |
| 2002/0165905 A1 | 11/2002 | Wilson | |
| 2003/0088452 A1 | 5/2003 | Kelly | |
| 2004/0143600 A1* | 7/2004 | Musgrove et al. | 707/104.1 |
| 2004/0230511 A1* | 11/2004 | Kannan et al. | 705/35 |
| 2005/0044197 A1 | 2/2005 | Lai | |
| 2006/0069564 A1 | 3/2006 | Allison et al. | |
| 2006/0129446 A1* | 6/2006 | Ruhl et al. | 705/10 |
| 2006/0143068 A1* | 6/2006 | Calabria | 705/10 |
| 2006/0230064 A1 | 10/2006 | Perkowski | |
| 2006/0282326 A1 | 12/2006 | Lombardi | |
| 2007/0047691 A1 | 3/2007 | Tseng et al. | |
| 2007/0050234 A1 | 3/2007 | Corlett | |
| 2007/0050245 A1* | 3/2007 | Humphries et al. | 705/14 |
| 2007/0059096 A1 | 3/2007 | Boxall et al. | |
| 2007/0078833 A1 | 4/2007 | Chea et al. | |
| 2007/0112760 A1 | 5/2007 | Chea et al. | |
| 2007/0150537 A1 | 6/2007 | Graham | |
| 2007/0169096 A1 | 7/2007 | Chea et al. | |
| 2007/0174247 A1 | 7/2007 | Xu et al. | |
| 2007/0192155 A1 | 8/2007 | Gauger | |
| 2007/0244888 A1 | 10/2007 | Chea et al. | |
| 2007/0266023 A1* | 11/2007 | McAllister et al. | 707/6 |
| 2008/0004942 A1* | 1/2008 | Calabria | 705/10 |
| 2008/0005103 A1* | 1/2008 | Ratcliffe et al. | 707/5 |
| 2008/0097835 A1 | 4/2008 | Weiser | |
| 2008/0140577 A1 | 6/2008 | Rahman et al. | |
| 2008/0189274 A1 | 8/2008 | Mann | |
| 2008/0201643 A1* | 8/2008 | Nagaitis et al. | 715/738 |
| 2008/0222003 A1* | 9/2008 | Adstedt et al. | 705/26 |
| 2008/0244431 A1 | 10/2008 | Chea et al. | |
| 2008/0301055 A1 | 12/2008 | Borgs et al. | |
| 2009/0037412 A1 | 2/2009 | Bard et al. | |
| 2009/0276233 A1 | 11/2009 | Brimhall et al. | |
| 2010/0114883 A1 | 5/2010 | Chea et al. | |
| 2010/0131384 A1 | 5/2010 | Chen et al. | |
| 2010/0205549 A1 | 8/2010 | Chen et al. | |
| 2010/0205550 A1 | 8/2010 | Chen et al. | |
| 2011/0093393 A1 | 4/2011 | Chang et al. | |
| 2012/0109714 A1 | 5/2012 | Azar | |
| 2012/0246014 A1 | 9/2012 | Chen et al. | |

OTHER PUBLICATIONS www.BazaarVoice.com—Bazaarvoice solution, customer review and rating, Apr. 9, 2007.*

Office Action for U.S. Appl. No. 12/698,510, mailed Nov. 5, 2012, 24 pgs.

International Search Report and Written Opinion for International Patent Application No. PCT/US2010/000288, completed Mar. 18, 2010, mailed Mar. 31, 2010, 8 pgs.

Bazaarvoice, "Sephora.com Launches "Ratings & Reviews," Bringing Even More Information Than Ever to Beauty Seekers," San Francisco, CA, Sep. 4, 2008 [retrieved Mar. 18, 2010 from URL: http://bazaarvoice.com/press-room/us-press-room/268-pressreleasephpid67], 2 pgs.

International Search Report and Written Opinion for International Patent Application No. PCT/US2009/063560, mailed Dec. 31, 2009, 7 pgs.

Hoegg, R. et al., "Overview of Business Models for Web 2.0 communities", GeNeMe 2006, Dresden, Germany, Oct. 2006, 17 pgs.

Qui, G. et al. "Incorporate the Syntactic Knowledge in Opinion Mining in User-Generated Content" Zhejiang University, Apr. 22, 2008, 26 pgs.

"User Generated Content, Research Brief", Feb. 2008, produced by Resource Interactive and BazaarVoice, 7 pgs.

Office Action for U.S. Appl. No. 12/614,016, mailed Jul. 28, 2010, 12 pgs.

Office Action for U.S. Appl. No. 12/243,679, mailed Nov. 30, 2010, 14 pgs.

www.Bazaarvoice.com—Overview (http://web.archive.org/web/20070408141819/bazaarvoice.com/overview.html).

www.Bazaarvoice.com—Solution (http://web.archive.org/web/20070409104639/bazaarvoice.com/solution.html).

www.Bazaarvoice.com—Syndicate Voice (http://web.archive.org/web/20070202125252/bazaarvoice.com/SyndicateVoice.html).

Office Action for U.S. Appl. No. 12/614,016, mailed Dec. 22, 2010, 6 pgs.

Office Action for U.S. Appl. No. 12/614,016, mailed Jun. 21, 2011, 7 pgs.

Office Action for U.S. Appl. No. 12/243,679, mailed Aug. 3, 2011, 16 pgs.

"You're It," a blog on tagging at http://www.tagsonomy.com/, printed Dec. 12, 2007, 13 pgs.

Arrington, Michael "Profile: DinnerBuzz," Jun. 2005, 4 pgs., at http:///www.techcrunch.com/2005/07/03/profile-dinnerbuzz/, printed on Dec. 12, 2007.

AdamNation tagging blog posted on Jul. 28, 2005 at http://adam.easyjournal.com/entry.aspx?eid=2632426 printed on Dec. 12, 2007, 5 pgs.

PeerPressure >> Scrumptious blog, dated Mar. 22, 2005, at http://www.allpeers.com/blog/?page_id=71, printed Dec. 12, 2007, 19 pgs.

Golder, Scott A. and Huberman, Bernardo A., "The Structure of Collaborative Tagging Systems," Information Dynamics Lab, HP Labs, Aug. 18, 2005, 8 pgs.

Arrington, Michael, Amazon Tags, Nov. 14, 2005, at http://www.techcrunch.com/2005/11/14/amazon-tags/, printed Dec. 12, 2007, 7 pgs.

Ugoretz, Joseph, "Three Stars and a Chili Pepper: Social Software, Folksonomy, and User Reviews in the College Context," Academic Commons, Jun. 9, 2006, at http://www.academiccommons.org/commons/essagy/Ugoretz-social-software-folksonomy, printed Dec. 12, 2007, 5 pgs.

Beach, David and Gupta, Vivek, Yahoo! Search Blog: Social Commerce via the Shoposphere & Pick Lists, Nov. 14, 2005, at http://www.ysearchblog.com/archives/000214.html, printed Dec. 12, 2007, 4 pgs.

Kroski, Ellyssa, "The Hive Mind: Folksonomies and User-Based Tagging," Dec. 7, 2005, at http://infotangle.blogsome/2005/12/07/the-hive-mind-folksonomies-and-user-based-tagging/, printed Dec. 12, 2007, 15 pgs.

Xu Zhichen, Yun Fu, Jianchang Mao and Difu Su, "Towards the Semantic Web: Collaborative Tag Suggestions," Yahoo! Inc., Santa Clara, CA, 8 pgs, in WWW2006: Proceedings of the Collaborative Web Tagging Workshop, 2006.

Office Action for U.S. Appl. No. 12/614,016, mailed Oct. 26, 2011, 8 pgs.

Office Action for U.S. Appl. No. 12/243,679, mailed Dec. 27, 2011, 15 pgs.

Office Action for U.S. Appl. No. 12/614,016, mailed Feb. 8, 2012, 9 pgs.

Office Action for U.S. Appl. No. 12/698,510, mailed Apr. 2, 2012, 26 pgs.

European Search Report for European Patent Application No. 09825479.0, mailed Mar. 27, 2012, 5 pgs.

Notice of Allowance for U.S. Appl. No. 12/614,016, mailed May 9, 2012, 4 pgs.

Prospero Unveils New Hosted Community Application for Custom-Branded Rating and Reviews: PR Newswire, New York, Feb. 13, 2006, 1 pg. at http://proquest.umi.com/pqdweb?did=985933201&sid=15&Fmt=3&clientId=19649&RQT=309&Vname=PQD.

Notice of Allowance for U.S. Appl. No. 12/243,679, mailed Jul. 5, 2012, 13 pgs.

Corrected Notice of Allowability for U.S. Appl. No. 12/243,679, mailed Jul. 19, 2012, 13 pgs.

Office Action for U.S. Appl. No. 13/492,642, mailed Sep. 11, 2012, 7 pgs.

* cited by examiner

WORKBENCH — Logged into test | Logout | Feedback

Ratings & Reviews | > Ask & Answer

Executive Summary (metrics are accurate through 05/06/2007)

| Key Performance Indicator | Last 7 Days (04/30/2007 - 05/06/2007) | Last 30 Days (04/07/2007 - 05/06/2007) | Last 60 Days (03/08/2007 - 05/06/2007) | Cumulative (05/03/2007 - 05/06/2007) |
|---|---|---|---|---|
| Number of Submitted Questions | 7 | 7 | 7 | 7 |
| Number of Questions Pending Moderation | 1 | 1 | 1 | 1 |
| Average # of Questions Submitted Daily | 1 | 0 | 0 | 2 |
| Number of Unanswered Approved Questions | 6 | 6 | 6 | 6 |
| Number of Answered Approved Questions | 0 | 0 | 0 | 0 |
| Number of Products with Submitted Questions | 2 | 2 | 2 | 2 |
| Number of Products with Unanswered Approved Questions | 1 | 1 | 1 | 1 |
| Number of Products with Answered Approved Questions | 0 | 0 | 0 | 0 |
| Number of Submitted Answers | 0 | 0 | 0 | 0 |
| Number of Answers Pending Moderation | 0 | 0 | 0 | 0 |
| Average # of Answers Submitted Daily | 0 | 0 | 0 | 0 |
| Average number of Answers per Question (this only applies to published questions that have at least 1 answer) | 0 | 0 | 0 | 0 |

Questions Status Summary

| | | | | |
|---|---|---|---|---|
| % Approved | 86% | 86% | 86% | 86% |
| % Rejected | 0% | 0% | 0% | 0% |
| % in Moderation | 14% | 14% | 14% | 14% |
| % Removed by Client | 0% | 0% | 0% | 0% |

Answers Status Summary

| | | | | |
|---|---|---|---|---|
| % Approved | N/A | N/A | N/A | N/A |
| % Rejected | N/A | N/A | N/A | N/A |
| % in Moderation | N/A | N/A | N/A | N/A |
| % Removed by Client (includes the Answers that are automatically removed when a Question is removed) | N/A | N/A | N/A | N/A |

© 2005-2007 Bazaarvoice, Inc.

Sidebar:
- Bazaarvoice
- Home
- Reports
  - Executive Summary
  - Analyst Reports
- Alerts
- Admin
  - Manage Contributors
  - Bulk Badge Assignment
  - Search Badge Index
  - Manage Content
  - Client Response Tool
  - Review Removal Tool
  - Answer Management Tool
  - Manage Workbench Users
- User Management
  - Change Password

```
┌─────────────────────────────────────────────────────────────────┐
│ ⓘ Dell.com Inspiron 1525 Customer Ratings & Reviews - Top & Best Rated Products - Mozilla Firefox  ▢□✕ │
├─────────────────────────────────────────────────────────────────┤
│ ⊕ http://reviews.dell.com/2341bb/928/reviews.htm?format=brandvoice&bbpid=8892969    ☆ │
├─────────────────────────────────────────────────────────────────┤
│  ┌───────────────────────────────────────────────────────────┐  │
│  │  ┌─────┐                                                   │  │
│  │  │BEST │     Customer Reviews Collected from Dell.com      │  │
│  │  │BUY  │                                                   │  │
│  │  └─────┘                                                   │  │
│  └───────────────────────────────────────────────────────────┘  │
│  ┌───────────────────────────────────────────────────────────┐  │
│  │ Inspiron 1525                                              │  │
│  │ Average Customer Rating:      ★★★★☆ 4.5 out of 5            │  │
│  │ 970 of 1,032 (94%) customers would recommend this product to a friend. │
│  └───────────────────────────────────────────────────────────┘  │
│  Customer Reviews for Inspiron 1525         │Choose a sort order▼│
│                                                                  │
│  ┌─────────────────────┐                                         │
│  │ ☼ │ FEATURED REVIEW │                                         │
│  └─────────────────────┘                                         │
│  Customer Rating:  ★★★★☆ 4.0                                     │
│  Inspiron Laptop, 09/15/2008                                     │
│  By LindyandGidget from Boston                                   │
│  Quality:    ▭▭▭▭ 4.0                                            │
│  Features:   ▭▭▭▭ 4.0                                            │
│  Value:      ▭▭▭▭▭ 5.0                                           │
│                                                                  │
│  Pros: I bought two laptops for my teenage children for school and they are absolutely thrilled with the │
│  functionality and ease of using the built-in software! We have a Dell desk top computer that is a few │
│  years old and now are hoping to replace it with a Dell laptop as well. │
│                                                                  │
│  "The whole process from order to shipping and receipt was easy and met all our expectations." │
│                                                                  │
│  Duration of product use: Less than a month                      │
│  Level of expertise: Average                                     │
│  Processor: Intel Core 2 Duo T5450 (1.66GHz/667MHz FSB 2MB Cache)│
│  Hard Drive: 160GB SATA Hard Drive 5400RPM                       │
│  Memory: 2GB Shared Dual Channel DDR2 SDRAM at 667MHz            │
│                                                                  │
│  227 of 251 people found this review helpful.                    │
│  ┌───────────────────────────────────────────────────────────┐  │
│  │ Review 2 for Inspiron 1525                                 │  │
│  └───────────────────────────────────────────────────────────┘  │
└─────────────────────────────────────────────────────────────────┘
```

*FIG. 4E*

METHOD AND SYSTEM FOR DISTRIBUTION OF USER GENERATED CONTENT

RELATED APPLICATIONS

This application is a continuation of, and claims a benefit of priority under 35 U.S.C. 120 of the filing date of U.S. patent application Ser. No. 12/243,679 by inventors Chad Bockius et al. entitled "Method and System for Distribution of User Generated Content" filed on Oct. 1, 2008, which in turn claims the benefit of priority under 35 U.S.C. §119 to U.S. Provisional Patent Application No. 61/076,852, filed Jun. 30, 2008, entitled "Method and System for Distribution of Generated Content" by Chad Bockius et al., both of which are hereby fully incorporated by reference herein.

TECHNICAL FIELD

This invention relates generally to the distribution of content. More particularly, embodiments of this invention relate to the distribution of user-generated content. Even more specifically, certain embodiments of this invention relate to the distribution of user-generated content gathered by a manufacturer (which may include manufacturers or distributors of goods, providers of services, etc.).

BACKGROUND

Today's consumer is inundated with advertising. In fact, advertising is so ubiquitous it is often times ignored. What is more, many people lack the belief that companies tell the truth in advertisements. As a result, word of mouth marketing and advertising has become increasingly important with respect to the sales of certain products. Word of mouth refers to the passing of information, especially recommendations, but also general information. In the context of advertising and marketing, the use of word of mouth may mean passing information between consumers or other entities, including manufacturers, experts, retailers, etc. to convey aspects or merits of a product or service, or the experience one person has related to that product or service, or related products or services.

The emergence of the importance of word of mouth marketing and advertising has coincided with the use of the Internet for researching, shopping and purchasing of products. Thus, online marketing and advertising has also become increasingly important. The use of word of mouth marketing in an online setting may therefore be an effective method for such online advertising, as consumer recommendations allow word of mouth advertising to be disseminated either online or offline.

In fact, according to a 2007 global Nielsen survey, consumer recommendations are the most credible form of advertising, as cited by 78% of the study's respondents. When businesses enable customers, or other types of users, to write reviews, ask or answer questions from the community, or share experiences, they create content that become powerful forms of marketing, and in particular, as discussed above, word of mouth marketing.

This view has been widely reinforced by many retailers (retailers will be used herein to refer to any type of seller of product or service, for example both online and brick and mortar) who report that products with relatively more reviews sell better and are returned less often. Thus, user-generated content (comprising any information such as text, audio, video, or other information carrying medium generated by a user who is a consumer (of goods, a product, website, service, purchaser of the product, etc.)) may be extremely important to manufacturers, retailers or other sellers of a product or service (collectively referred to herein as a product) as user-generated content may allow products to be differentiated and sales of products increased.

As this user-generated content may include such things as user reviews, user stories, ratings, comments, problems, issues, question/answers, or other type of content which, for example, a user is allowed to compose or submit through any medium, there may be many methods and locations (for example, online or offline) where a user may be allowed to generate content and the user content generated may be provided in a wide variety of mediums or formats the distribution of this user-generated content may be difficult. In fact, in many cases user-generated content may be more effectively generated or gathered at one location and more effectively utilized at a different location. Thus, the effective collection and distribution of user-generated content may be important to both manufacturers and retailers of products, as utilization of such user-generated content may increase sales of these products.

Accordingly, improved systems and methods for the collection and distribution of user-generated content are desired.

SUMMARY

Systems and methods for distributing user-generated content are disclosed. Specifically, embodiments of the present invention may allow content to be generated by a user at a manufacturer's site with respect to a corresponding product and this content distributed to one or more retailers who sell that product such that the user-generated content may be incorporated into the retailer's site or brick and mortar location in conjunction with that product to allow consumers shopping at that retailer to access or view such user-generated content.

More particularly, users may generate and submit content on a manufacturer's site using one or more content generation tools incorporated in the manufacturer's site. User-generated content may be received at a content distribution system and vetted using a moderation process by which undesired user-generated content may be filtered out either before it is distributed to retailers or before the undesired user-generated content is incorporated into a retailer's site or brick and mortar location. User-generated content associated with a particular product may then be distributed to one or more retailers who sell this product such that this content may be incorporated into the retailer's site or brick and mortar location in association with that product. In certain embodiments, a matching process may be utilized to match a product of a manufacturer with a product at a retailer's site such that user-generated content may be easily disseminated to a retailer and incorporated at the retailer with respect to the correct product.

In one embodiment, user-generated content may be received from a manufacturer of a first product at a content distribution system, wherein the user-generated content corresponds to the first product or the manufacturer. The user-generated content may be associated with one or more second products sold by a retailer and the user-generated content corresponding to the first product may be distributed from the content distribution system to the retailer and incorporated into a portion of a site of the retailer corresponding to the one or more second products. The manufacturer can then be charged a fee based on the distribution of this user-generated content.

Aspects and embodiments of the invention may provide the advantage of improving retailer sales by increasing online and in-store awareness of the manufacturer's products, driving sales (which may cost the retailer nothing). Manufacturers are able to differentiate their products, and create a link to consumers at the same time.

Furthermore, manufacturers that provide user-generated content may be able to generate more "shelf space" on online retailer sites, allowing customers to differentiate products in the midst of competitive products. This allows manufacturers to increase overall product information without generating themselves. Additionally, by distributing such user-generated content manufacturers can increase overall content volume, such as number of reviews or other types of content, therefore increasing the chances that its products will be chosen by shoppers who are interested in hearing the opinions and experiences, or obtaining assistance, from other users familiar with the product.

This user-generated content may be seamlessly integrated with that generated or found on retailers' sites, so the consumer cannot tell whether the reviews came from the retailer or the manufacturer. Alternatively, this integrated content may be identifiable by the consumer as being sourced from the manufacturer or the content may be segregated and clearly denoted as being sourced from the manufacturer. Consumers can find a wider variety of reviews and content at their favorite retailer site, enabling them to research and buy in one place. As a result, consumers may not have to rely on a salesperson at a store to provide information. They can read about tests conducted by expert reviewers, get product specifics from the manufacturer, ask experts or product owners questions, and get reviews and real-world experiences from consumers like them.

Retailers or manufacturers may also make the content sourced from the manufacturer available within the retailer's brick and mortar store in the form of shelf tags, in-store signage, kiosks, mobile web sites, mobile SMS messages, in-store video marketing available to in-store shoppers to the same effect as online shoppers.

Retailers can instrument or tag their sites and brick and mortar stores using internet web analytics methods to measure how user-generated content from manufacturers affects sales, conversions, repeat store visits, time spent onsite, shopping cart abandonment, average order size, website traffic or in-store foot traffic volume. This analysis can fuel further merchandising efforts, such as allowing top-rated products to be included in special navigation paths or highlighted in customer communications.

Thus, user-generated content helps increase the overall attention and content a manufacturer's product can get online and offline. Instead, a manufacturer may pay a fee to a content distributor for distributing content generated at the manufacturer's site to one or more retailers which sell the product. In conjunction with the payment from manufacturers to the content distributor, the content distributor may provide a variety of services, including the collection and moderation of such user-generated content, the association of products offered by the manufacturer to products sold at the retailer and formatting and hosting of user-generated content.

Thus, instead of being paid based upon lead generation (for example, referring or directing a person to a retailer), content distributor may leverage its position as a centralized location for the collection and distribution of user-generated content to implement a number of payment schemes to charge a manufacturer based upon the distribution of user-generated content obtained from the manufacturer. These pricing schemes may be tiered schemes, based the amount of user-generated content associated with a product, brand, manufacturer, etc, the number of retailers to which the content is distributed, the number of times user-generated content is distributed to each retailer (for example, number of views of pages in which user-generated content from that manufacturer incorporated) some other criteria or some combination of criteria. The information to calculate such fees may be readily determined as user-generated content may be both received at, and distributed from, the content distributor.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 2 is a depiction of one embodiment of an interface.

Figure 4A:
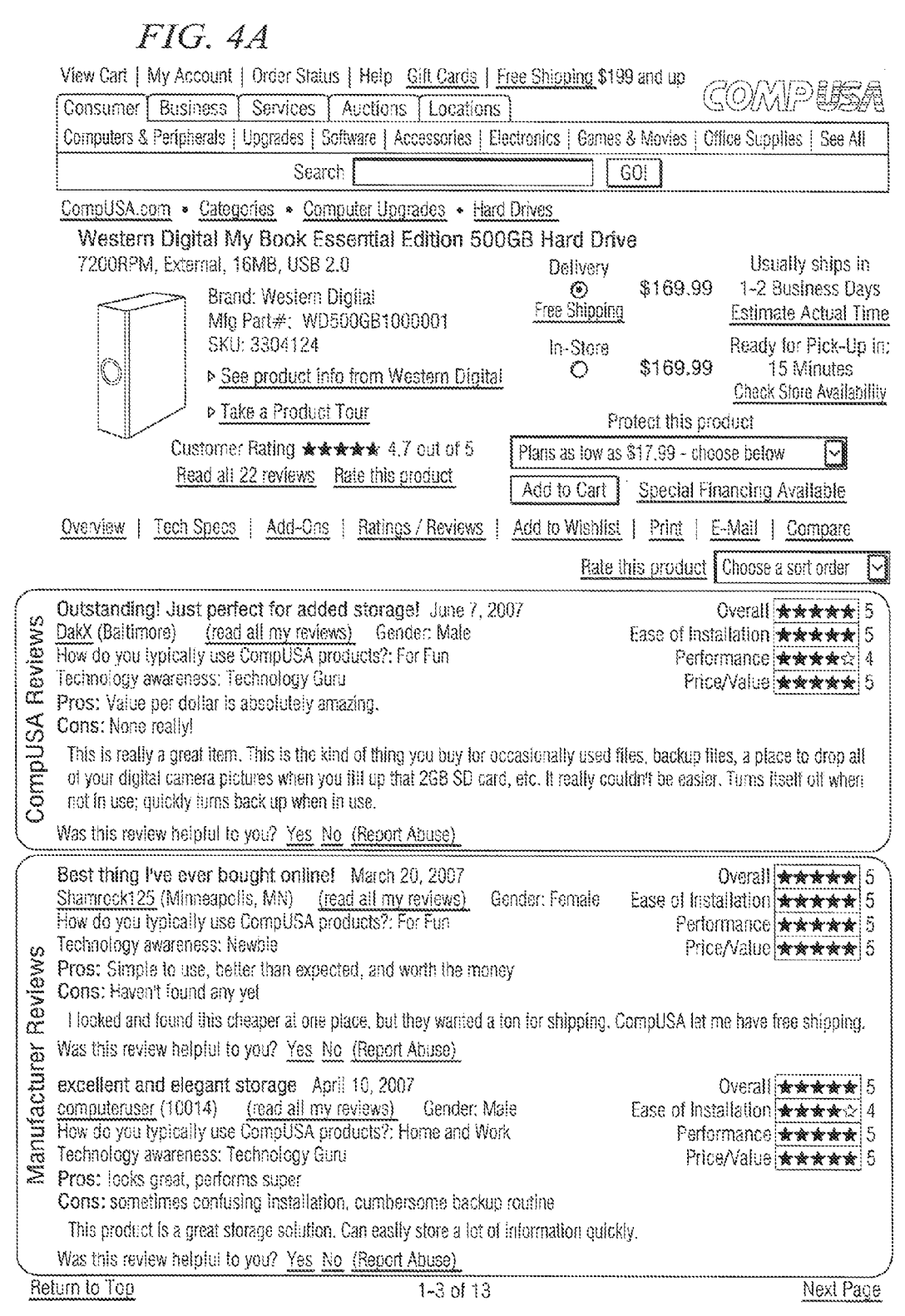
Figure 4C:
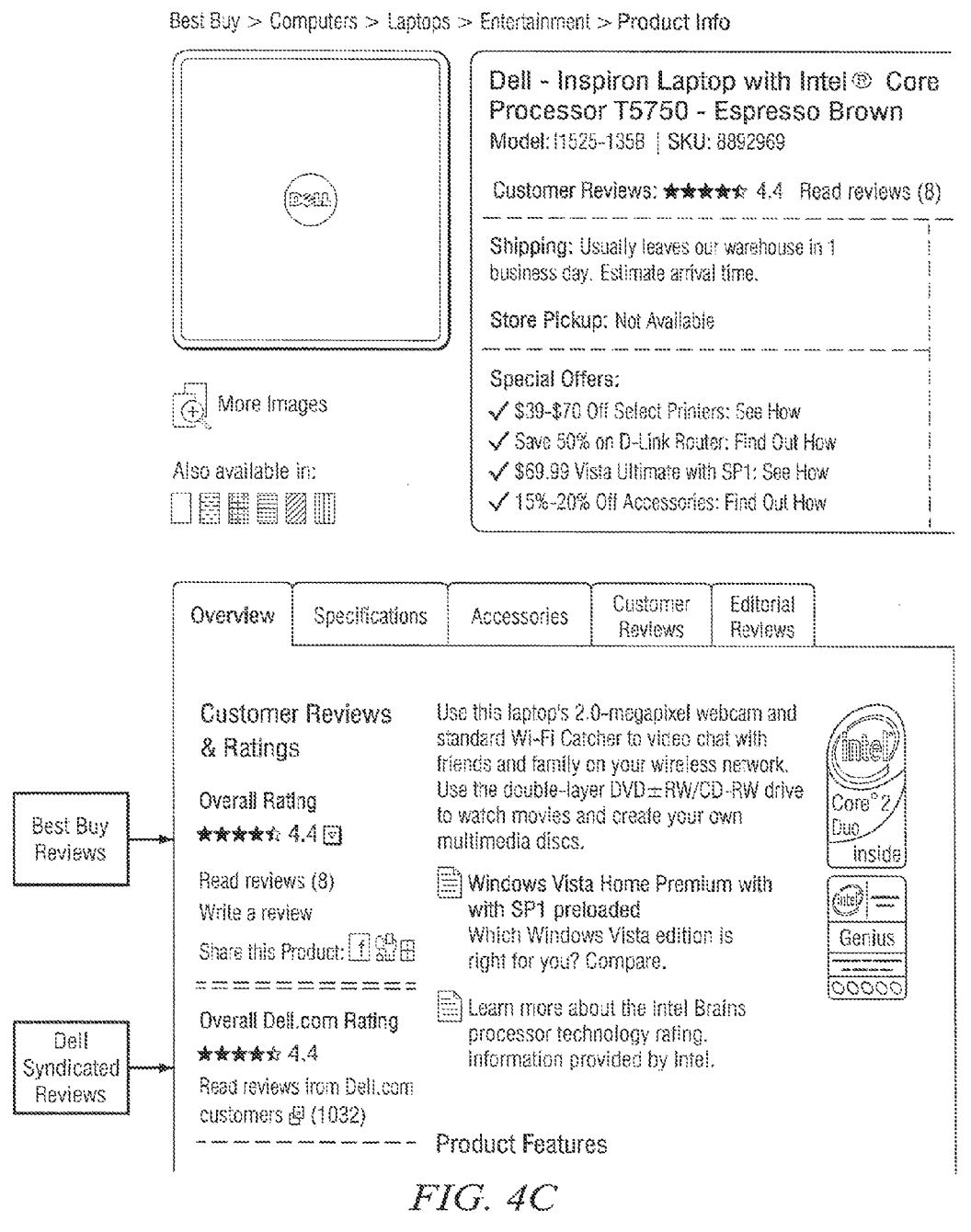

FIGS. 4A, 4B, 4C, 4D and 4E are depictions of embodiments of the incorporation of user-generated content.

DETAILED DESCRIPTION

Figure 1:
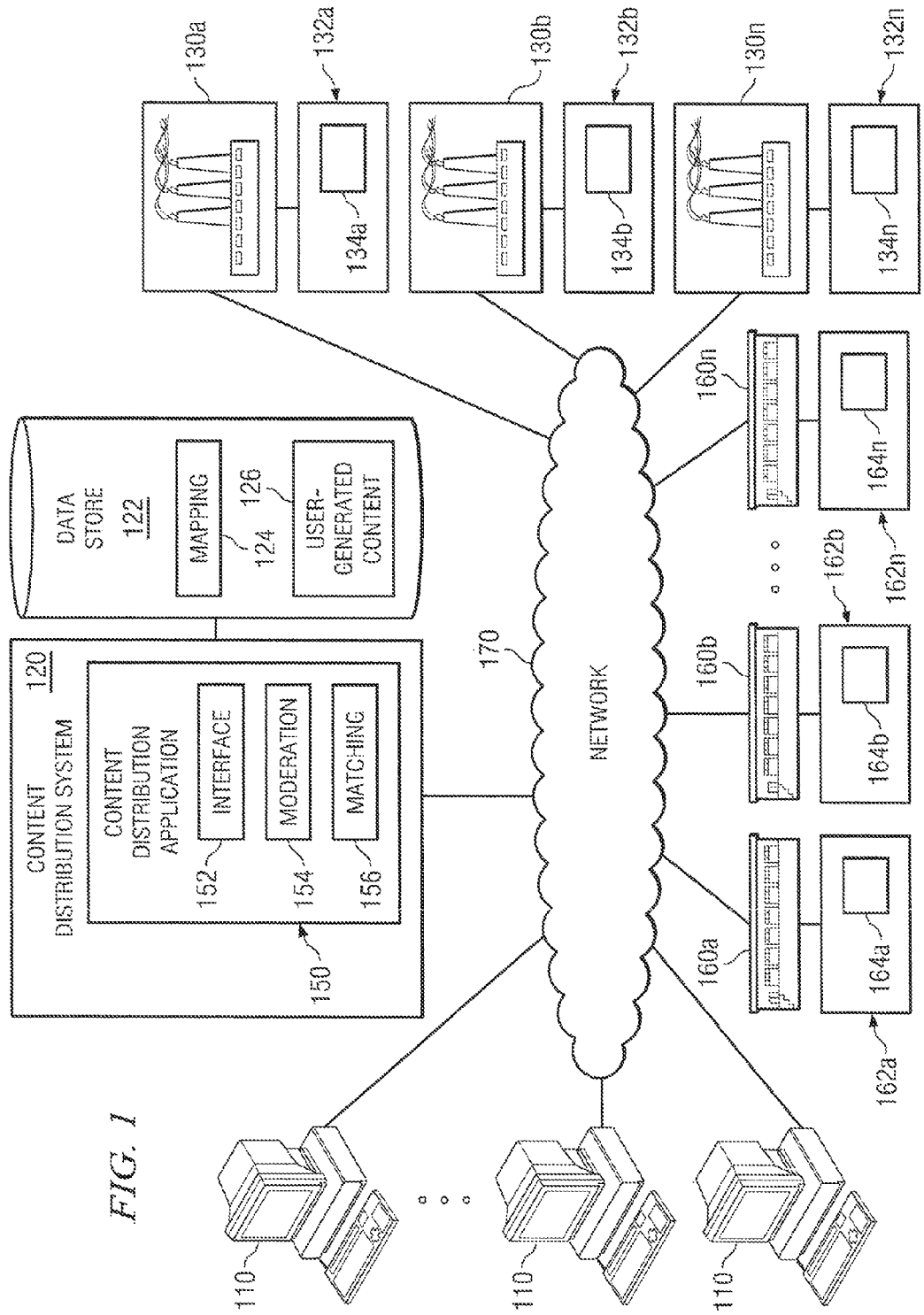
FIG. 1 is a block diagram of one embodiment of a content distribution system and an associated embodiment of an architecture in which such a content distribution system may be utilized.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

As used herein, the terms "comprises," "comprising," "includes," "including," "has," "having" or any other variation thereof, are intended to cover a non-exclusive inclusion.

For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments of the present invention can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU or capable of being complied or interpreted to be executable by the CPU. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, ratio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Before discussing specific embodiments a brief overview of the context of the disclosure may be helpful. As discussed above the generation, distribution and use of user-generated content is increasingly important in the modern marketplace. As such, in many cases, retailers may provide customers the ability to produce such user-generated content. These retailers may, however, sell a wide variety of products from a wide variety of manufacturers. As a consequence it may be difficult to build up a critical mass of user-generated content (enough to effect purchasing or other consumer decisions) with respect to any particular one product.

It is therefore in the best interest of manufacturers (including other wholesalers, sellers, etc.) to provide methods that enable a user to generate content regarding one of their products and many manufacturers have done just that. In many instances, however, these manufacturers may not be the main outlets for the sales of these products, thus it may be desired to provide this user-generated content created at the manufacturer's site to the actual sellers of the manufacturer's products. The dissemination of this content has, however, proved problematic for a variety of reasons. For example, retailers (i.e. any seller of a manufacturer's product) may desire to have user-generated content vetted before it is included on their sites, the same product may be differently identified with respect to the manufacturer's site and the retailer site, it may be time consuming to manually incorporate such user-generated content into a retailer's website, etc. Thus, what is desired are systems and methods which allow generation of content by a user at a manufacturer's site and the simple distribution and incorporation of this user-generated content at appropriate retailers' sites.

To that end, attention is now directed to embodiments of the systems and methods for distributing user-generated content. Specifically, embodiments of the present invention may allow content to be generated by a user at a manufacturer's site with respect to a corresponding product and this content distributed to one or more retailers who sell that product such that the user-generated content may be incorporated into the retailer's site or brick and mortar location in conjunction with that product to allow consumers shopping at that retailer to access or view such user-generated content.

More particularly, user's may generate and submit content on a manufacturers site using one or more content generation tools incorporated in the manufacturer's site. User-generated content may be received at a content distribution system and vetted using a moderation process by which undesired user-generated content may be filtered out either before it is distributed to retailers or before the undesired user-generated content is incorporated into a retailer's site or brick and mortar location. User-generated content associated with a particular product may then be distributed to one or more retailers who sell this product such that this content may be incorporated into the retailer's site or brick and mortar location in association with that product. In certain embodiments, a matching process may be utilized to match a product of a manufacturer with the a product at a retailer's site such that user-generated content may be easily disseminated to a retailer and incorporated at the retailer with respect to the correct product.

Retailers may be provided with an interface to monitor aspects of this process, including the generation of content at their site by users or the incorporation of user-generated content created at a manufacturer's site. This interface may, for example, allow a retailer to run a report by categories of products for sale, brands, user-generated content (for example, user-generated content accepted or rejected for publishing), etc.

Turning now to FIG. 1, one embodiment of an architecture including one embodiment of a content distribution system is depicted. Manufacturers 130 (shown individually as manufacturers 130a, 130b . . . 130n) may produce, wholesale, distribute or otherwise be affiliated with the manufacturer or distribution of one or more products. Retailers 160 (shown individually as retailers 160a, 160b . . . 160n) may be sales outlets for products made by one or more of manufacturers 130. In fact, in most cases each retailer 160 will sell products from multiple manufacturers 130. These products may be provided for sale in conjunction with one or more websites (referred to as sites) 162 (shown for the individual retailers as sites 162a, 162b . . . 162n) or brick and mortar stores provided by each of retailers 160 such that users at computing devices 110 may access the retailer's site 162 over network 170 (for example, the Internet) in order to purchase these products or perform other actions.

In addition to offering the ability to purchase these products, retailer's site 162 may offer the ability for a user to access user-generated content associated with the products offered for sale on the retailer's site 162. By accessing such user-generated content at the retailer's site 162 a user may be better able to make a purchasing decision with respect to the various products offered for sale on that retailer's site 162 or may be more inclined to buy a product, as the user feels that the product has received positive user-generated content (reviews, ratings, etc.) from a critical mass of other users, etc. A user may thus purchase manufacturer's product from a retailer 160 using retailer's site 162.

Retailer site 162 may also offer the ability for a user to generate content with respect to products offered for sale by retailer 160 (or other products). In other words, a user may utilize the retailer's site 162 to generate user reviews, ratings, comments, problems, issues, question/answers, or almost any other type of content regarding a product or experience with the product, brand, manufacturer or retailer, where this user-generated content may be displayed to other users accessing retailer's site 162.

It will be apparent, however, that there may be many other ways to purchase or obtain such a product. The product may be offered for sale at many physical stores which may or may not have an online presence (for example, a site), at other retailer's sites 162, the product may be purchased second hand, received as a gift, etc. At some point then the person who obtained this product may desire to provide some sort of feedback on this product and for a variety of reasons, such a purchaser may not have access to, or may not desire to utilize, retailer's site 162 to generate content in association with the obtained product.

To allow these types of people, among other types, to provide user-generated content with respect to a particular product, manufacturers 130 may provide manufacturer's sites 132 where these sites, or other means of collecting information from the user, manufacturer's site 132 (shown for the individual manufacturers as sites 132a, 132b . . . 132n) can provide the ability for a user to generate content with respect to the manufacturer's products. In other words, a user may use the manufacturer's site 132 or these other means, to generate user reviews, ratings, comments, problems, issues, question/answers, or almost any other type of content regarding a product, brand or manufacturer, usually regardless of where the user purchased the manufacturer's product.

In one embodiment, such user-generated content may include reviews, stories, ask/answer content or any other type of content in any format which the user wishes to add regarding a product, brand or service (collectively referred to as a product herein). Reviews may correspond to a user evaluation of a product and include ratings of product (for example, a number of stars), pros and cons of the product, a descriptive title and a description of a user's experience with a product, attributes of the user generating the review (for example, demographic information), other product which compliment or may be used with the product being reviewed, or any other type of evaluation of a product or aspects of a user's experience with the product. Ask/Answer content may comprise questions or answers submitted by a user, retailer or manufacturer concerning a potential purchase decision, for example regarding the capabilities or use of a product, demographic information on a user generating a question or answer. Stories may be user-generated content which may pertain to open ended experiences with a product which may be more tangentially related to the product than, for example, reviews.

In fact, a reader contemplating these types of scenarios may realize that a manufacturer's site 132 may receive much more user-generated content pertaining to a particular product of that manufacturer 130 than a retailer site 162 on which the same product is sold. This discrepancy results, in no small part, from the myriad number of ways of obtaining a particular product and that the association that a consumer makes between a manufacturer and a product may be much greater than the association perceived by a consumer between the product and a retailer 160 who sold that product.

As the amount of user-generated content associated with a product at a retailer's site 162 may greatly affect the sale of that product (both at that site 162 and off-line purchases as well), it may be desirable to both manufacturers 130 of a product and retailers 160 who sell that product that any user-generated content created in association with that product be displayed in conjunction with that product on a retailer's site 162 (which may increase revenue for both a retailer 160 and a manufacturer 130 of the product).

Content distribution system 120 may therefore be coupled to network 170 and serve to distribute content generated at manufacturer's site 162 with respect to a particular product to each of retailers' sites 162 which offers that product for sale such that the content generated by a user with respect to that product at the manufacturer's site 132 is incorporated into one or more of the retailer's sites 162 where the product is offered. Thus, content distribution system 120 allows content from one manufacturer 130 (for example, the manufacturer of a product) to be distributed to many retailers 160 who offer the product for sale. By centralizing the distribution and incorporation of such user-generated content a number of technical advantages may be achieved, especially with regards to the processing and storage of such user-generated content, including the moderation of such user-generated content and the formatting of such user-generated for incorporation in the sites 162 of retailers 160.

Furthermore, such a centralized distribution system may have a number of business advantages. For example, as the sale of their products is important to manufacturers 130, these manufacturers 130 may pay operators of content distribution system 120 for formatting or distributing the content generated at the manufacturer's sites 132 to the retailer's sites 162.

This is in contrast to the usual payment flows where the retailer 160 gets paid for displaying advertising, or content aggregators getting paid by portals who display the data and who in turn charge manufacturers 130 for lead generation. Similarly, since the incorporation of user-generated content may also drive off-line purchases (after reading reviews at a site 162 a potential purchaser may drive to a physical store to make a purchase of that good) payment may be made by a manufacturer 130 or retailer 160 irrespective of where the product was purchased (for example, on-line versus off-line purchases).

Content distribution system 120 will now be discussed in more detail. Content distributing system 120 may include one or more computers communicatively coupled to a network and a data store 122. Data store 122 may comprise set of user-content 126, which may be associated with one or more products of manufacturers 130, where this user-generated content may have been generated at manufacturer's site 132, retailer's site 162 or another location. A set of mappings 124 store associations between products of manufacturers 130 and products offered by retailers 160.

Content distribution system 120 may also include a content distribution application 150 which comprises an interface 152, a moderation module 154 and a matching module 156. The interface 152 may be one or more web pages or other type of GUI (which may accessed over network 170) allowing a user such as a marketing director affiliated with a manufacturer 130 or retailer 160 to monitor or affect the distribution of user-generated content, including observing the generation of content at their site by users or the incorporation of user-generated content created at a manufacturer's site 132. This interface 152, may for example, allow a retailer to run a report by categories of products for sale, brands, user-generated content (for example, accepted or rejected user-generated content), etc. One embodiment of such an interface is depicted in FIG. 2. Moderation module 154 may moderate (for example, filter or otherwise select) content which is, or is not to be, excluded or included. Matching module 156 may serve to match user-generated content received from a manufacturer 130 associated with a particular product with the same product on a retailer site 162.

A user may generate content regarding a product at manufacture's site 132 using a content generation tool 134 (for example, a GUI, webpage, etc.) (shown for the individual manufacturers as 134a, 134b . . . 134n) offered on the manufacturer's site 132. This tool 134 may be implemented or developed by operators of content distribution system 120 and provided to manufacturers 130 for use with their sites 132 to facilitate the generation of content by user's or the subsequent processing and distribution of such content by content distribution system 120. These tools 134 may be hosted by either the manufacturer (for example, operators of manufacturer's site 132) or by content distribution system 120. Thus, for example, on a page of manufacturer's site 132 a reference to content generation tool 134 may be included, such that the tool 134 hosted at content distribution system 120 may be included in the site 132.

In any event, the content generated by the user with respect to a product may be received by content distribution system. The received content may be moderated by moderation module 154, to determine if such content should be utilized for display on a site, or may be edited for suitability. This content can then be associated with one or more products offered for sale by retailer 160, or offered by the manufacturer 130, by, in one embodiment, associating the user-generated content with a product identifier for a product and stored in data store 122.

A user, shopping at, for example, retailer's site 162 may access a web page or other portion of the site corresponding to a particular product. User-generated content 126 associated with that product 164 may be displayed in an area 164 (shown for individual retailer websites as areas 164a, 164b . . . 164n) such that a user viewing a portion of the retailer's site 162 associated with a particular product may have user-generated content 126 associated with that product displayed to him. The display of this user-generated content to the user while he is shopping, may, in turn, motivate the user to make a purchase through retailer's site 162.

Manufacturers 130 may pay therefore pay operators of content distribution system 120 for distributing this user-generated content to the retailer's sites 162. The payment may be based on a flat-fee structure, the amount, size or number of pieces of user-generated content (for example, number of reviews), the number of times user-generated content is viewed (for example, as determined by number of page views), some other payment metric or some combination of payment metrics, wherein the cost structured may be tiered or otherwise segmented. After reviewing this disclosure it will be noted that the position of content distribution system 120 within the content distribution may facilitate the implementation of many types of payment methodologies as it may be relatively easy for content distribution system to accumulate the number of times particular user-generated content 126 is provided to a retailer's site 162 or how much user-content 126 associated with a manufacturer's products is distributed, etc. It will also be noted, that the manufacturer may be paying the operators of a centralized content distribution system 120, for the distribution of content created at the manufacturer's site 132 to retailers 160 who sell those products, regardless of whether a product is purchased from retailer 160.

Figures 3, 5:
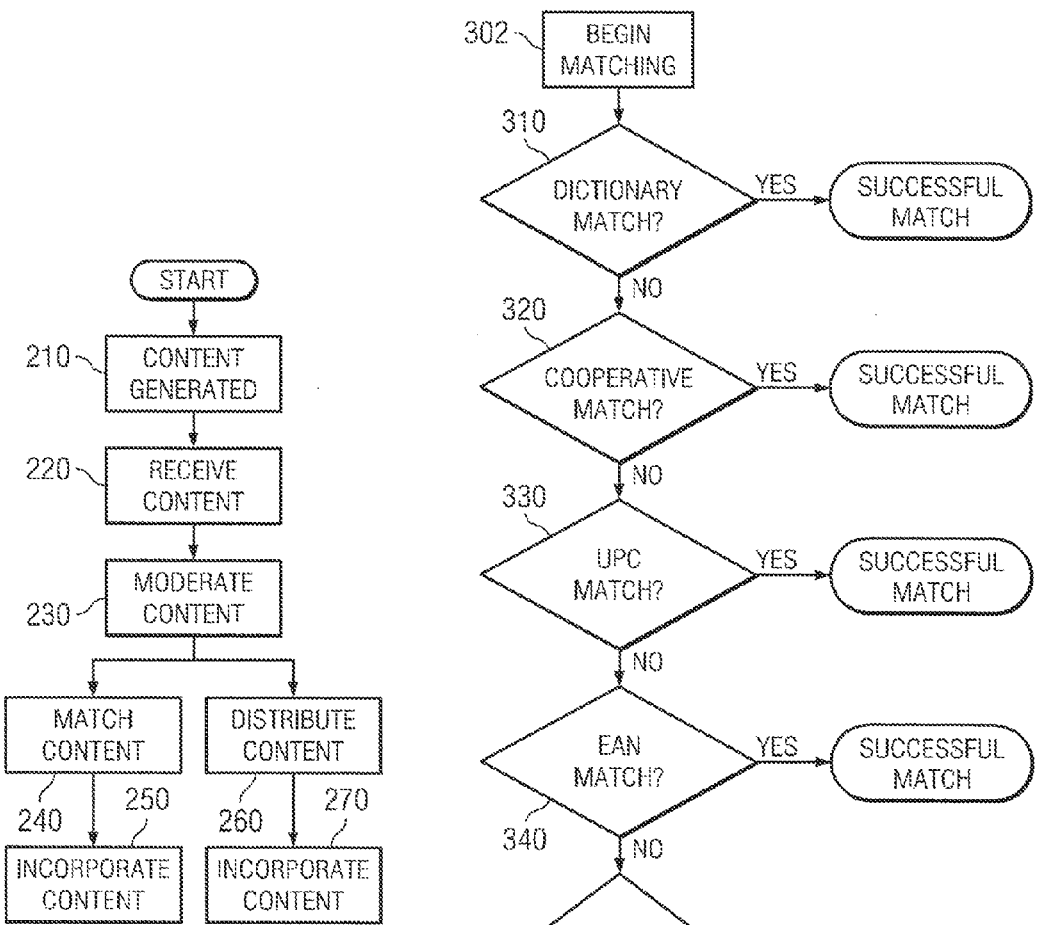
FIG. 3 is a flow diagram of one embodiment of a method for content distribution.
FIG. 5 is a flow diagram of one embodiment of a method for the matching of products.
Figure 4B:
Figure 4D:
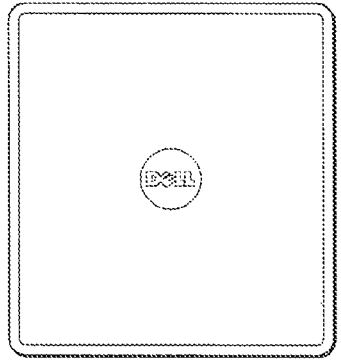

Moving to FIG. 3, a flow diagram for one embodiment of a method of distributing and incorporating user-generated content is depicted. At step 210 users may generate content with respect to one or more products produced or provided by the manufacturer at the manufacturer's site 132. As discussed above, in one embodiment, this content may be generated using a content generation tool 134 (for example, a GUI, webpage, etc.) offered on the manufacturer's site 132. At certain intervals then, at step 220, a set of user-generated content may be received at content distribution system 120, where each piece of user-generated content received may correspond to a product associated with manufacturer 130. The reception of this user-generated content by content distribution system may occur in almost any number of ways, including through a call into a web service provided by content distribution system 120 using an Application Programming Interface (API), such that user-generated content may be provided through this API; the user-generated content may be generated using a tool hosted by content distribution system 120 so user-generated content generated at manufacturer's site 162 is hosted at content distribution system 120, user-generated content may be sent, or gathered, from a third-party (not a retailer 160 or manufacturer 130) such as a web site which allows users to review a wide variety of products or received using a wide variety of other methods.

This content may be moderated at step 230 to filter the user-generated content in some way. This moderation process may include screening the received set of user-generated content for profanity, discriminatory speech, personal information, competitor references, spam, vacuous content, or almost any other screening or filtering desired. Content may be discarded based upon this filtering or appropriately edited either automatically or with human involvement.

This moderation may be accomplished through the use of one or more rules (which may be selected, altered, implemented, modified, etc. by users (associated with manufacturers 130, etc.) through interface 152). In one embodiment, these rules may be agreed upon by manufacturers 130 and retailers 160 so user-generated content may be filtered according to both the manufacturers' 130 and retailers' 160 desires. It will be noted that each combination of manufacturer 130 and retailers 160 selling products from that manufacturer 130 may agree upon a different set of rules and content associated with that manufacturer's products may be filtered according to those rules, such that content from manufacturer 130a that is desirable to retailer 160a may not be desirable to retailer 160b based on moderation rules agreed to by retailers 160b and manufacture 130a.

At step 240 the set of user-generated content may be matched. This matching process includes identifying one or products at a retailer corresponding to a piece of user-generated content such that each piece of content may be associated with a product offered for sale by a retailer 160 if such a product exists. Specifically, in many cases retailers 160 and manufacturers 130 may refer to products differently (for example, different UPCs, different SKUs, etc.). Thus, in one embodiment, mappings 124 may be established between products for sale at retailers 160 and products offered by manufacturers 130. These mappings may comprise association between one or more product identifiers for products offered by manufacturers 130 and one or more product identifiers for products for sale at retailers 160. Additionally, a piece of user-generated content may be associated with a product identifier (for example, used by manufacturer 130) such that using a product identifier used by either a manufacturer 130 or a retailer 160, corresponding user-generated content can be identified.

By utilizing mappings 124 of product identifiers used by a manufacturer 130 to those used by a retailer 160 a number of advantages may be achieved. Of significant note is that almost any type of desired matching may be accomplished including one product offered by a manufacturer to a corresponding product sold by a retailer 160, multiple products offered by a manufacturer 130 to one product sold by a retailer 160 or one product offered by a manufacturer 130 to multiple products sold by a retailer 160. This ability may be extremely advantageous as in many cases, the same product may be offered in many configurations (for example, computers with different amounts of memory, digital music players with of different memory sizes or colors, etc.). Manufacturers 130 and retailers 160 may, however, identify these products differently (for example, use different product identifiers) and may group these products differently. In other words, a particular product in multiple configurations may be identified by different product identifiers at a manufacturer 130 but may be identified by a single product number at a retailer 160 or vice versa. By establishing mappings 124 between product identifiers used by manufacturers 130 and retailers 160 appropriate user-generated content may be associated with a product or group of products no matter the difference in product identifiers or groupings of products utilized by manufactures 130 or retailers 160.

User-generated content associated with a product offered for a sale at the site 162 of a retailer 160 may then be incorporated in conjunction with that product on the retailer's site 162 at step 250. In one embodiment, a web page or portion of the site 162 or a retailer 160 corresponding to the product for sale may have an area 164 where user-generated content associated with that product is to be displayed. The source code associated with that area may comprise a reference or call (for example, an HTTP request) associated with that retailer's product identifier for that product. The HTTP request may be directed to content distribution system 120 which may receive the request and using the retailer's product identifier determine user-generated content 126 associated with that retailer's product identifier (for example, using mappings 124) and return the user-generated content associated with that product to the retailer 160 for display in the area 164 of the portion of the retailer's site 162 corresponding to that product.

Additionally, before distributing the user-generated content to the retailer's site 162 the content distribution system 120 may format the user-generated content according to a particular format, where the format may be a format used by the retailer 160, the manufacturer 130, the content distribution system 120 or some other format entirely. In one embodiment, the display of the user-generated content in the retailer site 162 can be varied to include or exclude a reference to a source (for example, the manufacturer), including the branding/logo of that source and a hyperlink back to the website of that source client. The display of user-generated content may also be sorted such that user-generated content may be segregated or ordered by source or intermixed with one other, summarized or condensed, with accessed to the full version on demand and be accessible or inaccessible to web search engines, such as Google, etc. It should be noted that appropriate user-generated content may be formatted, sorted or otherwise configured for display on a web site in almost any manner desired. For example, a hyperlink may be provided on a portion of a site corresponding to a product such that when a user clicks on the hyperlink a "pop-up" window comprising the user-generated content may appear. Embodiments of the incorporation of user-generated content into a web page for a product at a retailer site are depicted in FIGS. 4A, 4B, 4C, 4D and 4E.

In many cases, it may also be desirable to display content generated at a manufacturer's site 132 in conjunction with that product at the manufacturer's site 132 itself. Thus, in many cases user-generated content 126 generated at a manufacturer 130 and associated with a particular product may also be distributed to the manufacturer 130 offering that product at step 260 so user content generated at that manufacturer 130 for that product may, at step 270, be incorporated into that manufacturer's site 132 in conjunction with a portion of that site 132 corresponding to that product.

As can be imagined from a review of the above discussion, there may be a large number of both manufacturers 130 and retailers 160, a large number of products, a wide variety of different product identifiers and product configurations. Thus, the number of permutations of mappings between product identifiers may be commensurately huge, and the matching of products offered by each retailer 160 to those offered by each manufacturer 130 may be difficult or time consuming. Thus, efficient method for matching products associated with two sources such that a piece of user-generated content may be associated with the proper product is desired. It may be desired that embodiments of such methods avoid using any type of data to match that is ambiguous, such as a customer-specific identifier or natural text such as a name or description that might yield false positive matches.

Referring to FIG. 5, a flow diagram of one embodiment of a method for matching products is depicted. Matching such as this may be important for a variety of reasons, including the fact that while most retailers 160 wish to include such user-generated content on their sites 162, they do not wish to perform additional integration with respect to those sites 162.

Additionally, different identifiers may be utilized for the same product by manufacturers 130 and each of retailers 160. Specifically, in many cases retailers 160 and manufacturers 130 may refer to products differently (for example, different UPCs, different SKUs, etc.). Thus, in one embodiment, mappings 124 may be established between products for sale at retailers' 160 and products offered by manufacturers 130. These mappings may comprise association between one or more product identifiers for products offered by manufacturers 130 and one or more product identifiers for products for sale at retailers 160.

Thus, one embodiment of a matching method may use a tiered set of matching criteria where if any of the matching criteria matches, the match is considered successful. If the match is successful a mapping between product identifiers (i.e. any data which may be used to identify a product) for the product used by the manufacturer 130 and the retailer 160 may be established. As identifiers may change or new products added this matching process may occur at certain regular time intervals. Thus, such identifier changes or product additions may be accounted for in a relatively seamless manner.

First, at step 302 product data corresponding to a product offered by a manufacturer 130 along with product data corresponding to products offered by a retailer 160, where it is desired to match the product offered by the manufacturer 130 to a particular product offered by the retailer 160. At step 310, if provided, a product dictionary is consulted in order to determine if there is a match. This method is useful when it is possible to perform the matching work offline via automated or manual methods. At step 320, if provided, a specified cooperative matching key will be utilized. This key is mutually agreed upon by both operators of retailer 160 and manufacturer 130 as referring to the same item (in data associated with the user-generated content or product offered by the retailer 160). At step 330 the product UPC will be used for matching if both operators of retailer 160 and manufacturer 130 provide a valid UPC to operators of content distribution system 120. At step 340 the product EAN will be used for matching if both operators of retailer 160 and manufacturer 130 provide a valid EAN to operators of content distribution system 120. The product ISBN may also be used for matching if both operators of retailer 160 and manufacturer 130 provide a valid ISBN to operators of content distribution system 120. At step 350, the product brand and manufacturer 130 part number will be used for matching if both syndication partners provide a valid brand and manufacturer part number. In this case, both brand and manufacturer 130 part number may have to match to establish a mapping.

If there are no matches using these criteria, manual matching may be performed at step 360, where a human may evaluate each of the respective products to determine if two products should be associated with one another through a mapping. This manual matching may result in a determination that there is no match between two candidate products at step 360 or a successful match.

It should be noted that the matching criteria listed above are exemplary only, and that any desired criteria for matching user-generated content to a product may be utilized. For example, additional criteria may include other alpha-numeric product identifiers (the comparison of which may or may not be case sensitive) or manual matching between the user-generated content and a product. Additionally, any combination of matching criteria may be utilized along with weighting functions, confidence levels, etc. and that such matching may encompass one manufacture product to many retailer products, many manufacturer products to one retailer product, one manufacturer product to one retailer product, etc.

In the foregoing specification, the invention has been described with reference to specific embodiments. However, one of ordinary skill in the art appreciates that various modifications and changes can be made without departing from the scope of the invention as set forth. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method, comprising:
receiving, by a computer system, a set of user-generated content corresponding to a particular product, wherein the set of user-generated content was collected from one or more users of a website of a particular provider of the particular product;
determining, by the computer system, a set of products offered by an offeror, wherein the set of products includes one or more products that are different from the particular product, wherein the determining the set of products is based on the particular product corresponding to the set of user-generated content, and wherein the particular provider is a provider of the particular product to the offeror;
sending, by the computer system to the offeror, the set of user-generated content, wherein the set of user-generated content is configured to be used at a web site of the offeror; and
determining, by the computer system, a payment amount to assess to the particular provider, wherein the determining the payment amount is based on metrics associated with usage, at a portion of the web site of the offeror corresponding to the one or more products that are different from the particular product, of the set of user-generated content.

2. The method of claim 1, wherein the metrics associated with the usage of the set of user-generated content includes: a number of different entities to which ones of the set of user-generated content are sent for usage.

3. The method of claim 1, wherein the metrics associated with the usage of the set of user-generated content includes: a number of sales of ones of the set of products via the web site of the offeror.

4. The method of claim 1, wherein the metrics associated with the usage of the set of user-generated content includes: a number of views of ones of the set of user-generated content at the web site of the offeror.

5. The method of claim 1,
wherein the particular product is a service that is sold by the provider; and
wherein the offeror is an entity that markets the service that is sold by the provider.

6. The method of claim 1,
wherein the determining the payment amount is further based on metrics associated with usage, at a portion of the web site of the offeror corresponding to the particular product, of the set of user-generated content.

7. The method of claim 1,
wherein the particular product is a good that is manufactured by the provider;

wherein the offeror is a retailer that sells the good; and
wherein the metrics associated with the usage of the set of user-generated content includes a number of on-line sales of ones of the set of products by consumers that have viewed ones of the set of user-generated content at the web site of the retailer.

8. A content distribution system, comprising:
one or more processors;
memory, coupled to the one or more processors, storing instructions executable by the content distribution system, using the one or more processors, to cause the content distribution system to perform operations that include:
receiving a set of user-generated content corresponding to a particular product, wherein the set of user-generated content was collected from one or more users of a website of a particular provider of the particular product;
determining a set of products offered by an offeror, wherein the set of products includes one or more products that are different from the particular product, wherein the determining the set of products is based on the particular product corresponding to the set of user-generated content, and wherein the particular provider is a provider of the particular product to the offeror;
sending the set of user-generated content, wherein the set of user-generated content is configured to be used at a web site of the offeror; and
determining a payment amount to assess to the particular provider, wherein the determining the payment amount is based on metrics associated with usage, at a portion of the web site of the offeror corresponding to the one or more products that are different from the particular product, of the set of user-generated content.

9. The content distribution system of claim 8, wherein the metrics associated with the usage of the set of user-generated content includes:
a number of different products of the one or more products that are different from the particular product.

10. The content distribution system of claim 8, wherein the metrics associated with the usage of the set of user-generated content includes:
a number of sales of ones of the set of products via the web site of the offeror.

11. The content distribution system of claim 8, wherein the metrics associated with the usage of the set of user-generated content includes:
a number of views of ones of the set of user-generated content at the web site of the offeror.

12. The content distribution system of claim 8,
wherein the particular product is a service that is sold by the provider; and
wherein the offeror is an entity that markets the service that is sold by the provider.

13. The content distribution system of claim 8,
wherein the determining the payment amount is further based on metrics associated with usage, at a portion of the web site of the offeror corresponding to the particular product, of the set of user-generated content.

14. The content distribution system of claim 8,
wherein the particular product is a good that is manufactured by the provider;
wherein the offeror is a retailer that sells the good; and
wherein the metrics associated with the usage of the set of user-generated content includes a number of on-line sales of ones of the set of products by consumers that have viewed ones of the set of user-generated content at the web site of the retailer.

15. A non-transitory computer-readable medium having stored thereon instructions that are executable by a computing device to cause the computing device to perform operations that include:
receiving a set of user-generated content corresponding to a particular product, wherein the set of user-generated content was collected from one or more users of a website of a particular provider of the particular product;
determining a set of products offered by an offeror, wherein the set of products includes one or more products that are different from the particular product, wherein the determining the set of products is based on the particular product corresponding to the set of user-generated content, and wherein the particular provider is a provider of the particular product to the offeror;
sending the set of user-generated content, wherein the set of user-generated content is configured to be used at a web site of the offeror; and
determining a payment amount to assess to the particular provider, wherein the determining the payment amount is based on metrics associated with usage, at a portion of the web site of the offeror corresponding to the one or more products that are different from the particular product, of the set of user-generated content at the web site of the offeror.

16. The non-transitory computer-readable medium of claim 15, wherein the metrics associated with the usage of the set of user-generated content includes:
a number of different entities to which ones of the set of user-generated content are sent for usage.

17. The non-transitory computer-readable medium of claim 15, wherein the metrics associated with the usage of the set of user-generated content includes:
a number of sales of ones of the set of products via the web site of the offeror.

18. The non-transitory computer-readable medium of claim 15, wherein the metrics associated with the usage of the set of user-generated content includes:
a number of views of ones of the set of user-generated content at the web site of the offeror.

19. The non-transitory computer-readable medium of claim 15,
wherein the particular product is a service that is sold by the provider; and
wherein the offeror is an entity that markets the service that is sold by the provider.

20. The non-transitory computer-readable medium of claim 15,
wherein the particular product is a good that is supplied by the provider; and
wherein the offeror is an entity that resells the good that is supplied by the provider.

* * * * *